(12) United States Patent
Shapiro et al.

(10) Patent No.: US 6,978,461 B2
(45) Date of Patent: Dec. 20, 2005

(54) SYSTEM AND METHOD FOR ACCESSING FUNCTIONALITY OF A BACKEND SYSTEM FROM AN APPLICATION SERVER

(75) Inventors: Ari Shapiro, Beit Shemesh (IL); Miriam Efrach, Jerusalem (IL)

(73) Assignee: Sun Microsystems, Inc., Santa Clara, CA (US)

(*) Notice: Subject to any disclaimer, the term of this patent is extended or adjusted under 35 U.S.C. 154(b) by 513 days.

(21) Appl. No.: 09/792,810

(22) Filed: Feb. 28, 2001

(65) Prior Publication Data

US 2002/0120787 A1 Aug. 29, 2002

(51) Int. Cl.$^7$ ................................................ G06F 3/00
(52) U.S. Cl. .................... 719/311; 719/328; 709/203
(58) Field of Search .............................. 709/203, 217, 709/310, 328, 316, 246, 206; 719/313, 328; 715/513; 714/39; 717/114, 141

(56) References Cited

U.S. PATENT DOCUMENTS

| | | | |
|---|---|---|---|
| 5,142,681 A | * 8/1992 | Driscoll et al. | 717/141 |
| 5,265,239 A | * 11/1993 | Ardolino | 709/217 |
| 6,018,627 A | 1/2000 | Iyengar et al. | 717/103 |
| 6,023,579 A | 2/2000 | Hellgren et al. | 717/108 |
| 6,256,676 B1 | * 7/2001 | Taylor et al. | 709/246 |
| 6,311,327 B1 | * 10/2001 | O'Brien et al. | 717/114 |
| 6,560,723 B1 | * 5/2003 | Matsui | 714/39 |
| 6,745,229 B1 | * 6/2004 | Gobin et al. | 709/206 |

FOREIGN PATENT DOCUMENTS

WO  WO 98/15091  * 4/1998

OTHER PUBLICATIONS

Roman et al. "The Technical Benefits of EJB and J2EE technologies Over COM+ and Windows DNA" pp. 1–24, The Middle Company 1999.*

* cited by examiner

*Primary Examiner*—St. John Courtenay, III
*Assistant Examiner*—Van H. Nguyen
(74) *Attorney, Agent, or Firm*—Meyertons Hood Kivlin Kowert & Goetzel, P.C.; B. Noël Kivlin

(57) ABSTRACT

A system and method for automatically creating information useable to access functionality of a backend computer system coupled to an application server. The method may operate to connect to the backend computer system and obtain information specifying functionality of the backend system. The information obtained may be analyzed programmatically, and new information may be programmatically created based on the analysis, wherein the programmatically created information is useable for accessing the functionality of the backend system. For example, where the functionality comprises a programmatically callable function, the information created may include information specifying the function name, names of input and output parameters, data types of the parameters, etc. The programmatically created information may be stored in a repository for use in accessing the functionality of the backend computer system from the application server. For example, the information may be retrieved from the repository and used to programmatically construct appropriate data structures and/or execute appropriate code for interfacing with the backend system to access the desired functionality.

48 Claims, 14 Drawing Sheets

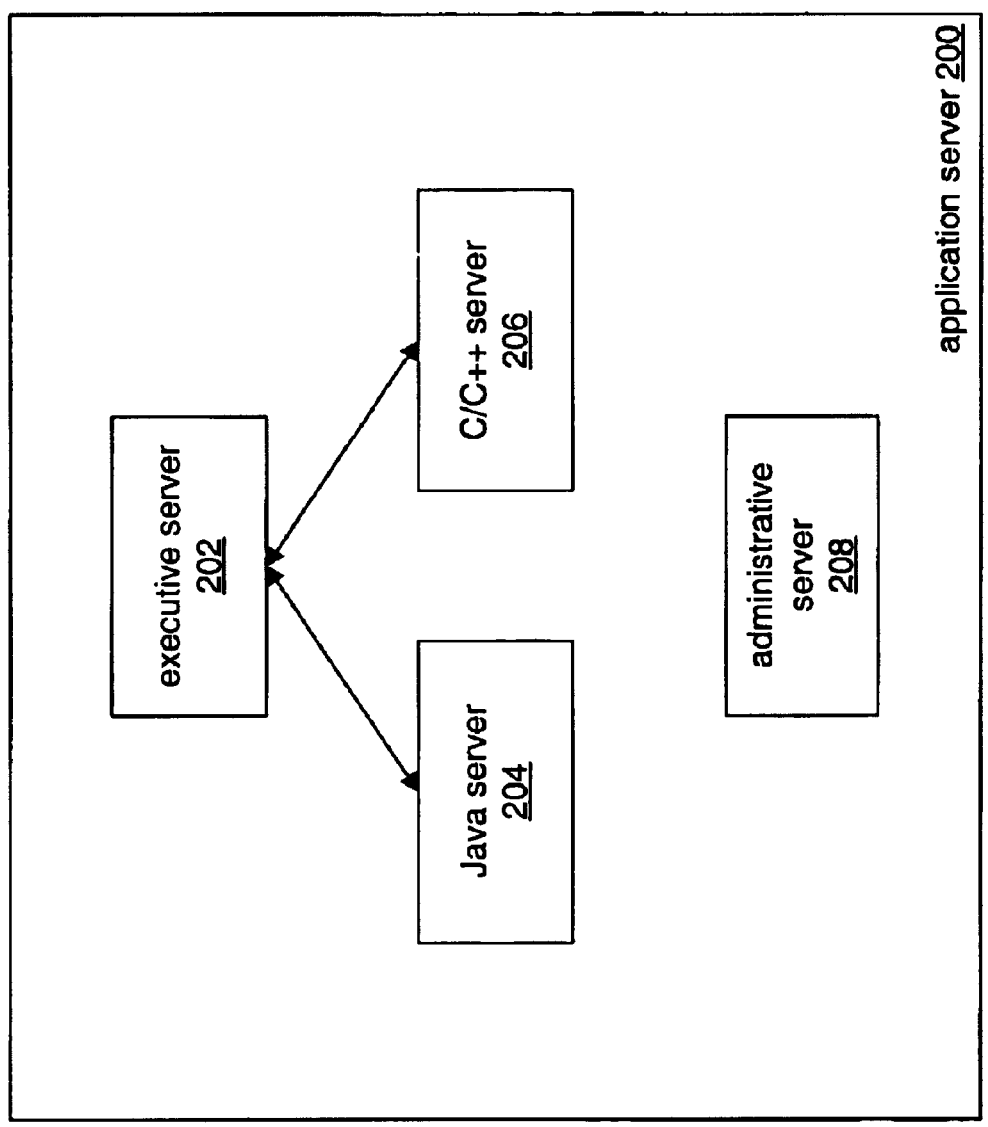

SYSTEM AND METHOD FOR ACCESSING FUNCTIONALITY OF A BACKEND SYSTEM FROM AN APPLICATION SERVER

BACKGROUND OF THE INVENTION

1. Field of the Invention

The present invention relates to the field of application servers, and more particularly to a system and method for accessing functionality of a backend system from an application server.

2. Description of the Related Art

The field of application servers has recently become one of the fastest-growing and most important fields in the computing industry. As web applications and other distributed applications have evolved into large-scale applications that demand more sophisticated computing services, specialized application servers have become necessary, in order to provide a platform supporting these large-scale applications. Applications that run on application servers are generally constructed according to an n-tier architecture, in which presentation, business logic, and data access layers are kept separate. The application server space is sometimes referred to as "middleware", since application servers are often responsible for deploying and running the business logic layer and for interacting with and integrating various enterprise-wide resources, such as web servers, databases, and backend or legacy systems.

Application servers offer significant advantages over previous approaches to implementing web applications, such as using common gateway interface (CGI) scripts or programs. FIG. 1 illustrates a typical architecture for a web application utilizing CGI scripts or programs. The client computer running a web browser may reference a CGI program on the web server, e.g., by referencing a URL such as "http://server.domain.com/cgi-bin/myprogram.pl". Generally, the CGI program runs on the web server itself, possibly accessing a database, e.g., in order to dynamically generate HTML content, and the web server returns the output of the program to the web browser. One drawback to this approach is that the web server may start a new process each time a CGI program or script is invoked, which can result in a high processing overhead, impose a limit on the number of CGI programs that can run at a given time, and slow down the performance of the web server. In contrast, application servers typically provide a means for enabling programs or program components that are referenced via a URL to run on a separate computer from the web server and to persist between client invocations.

Another common drawback of previous web application design models, such as the use of CGI programs, is related to data access. For example, if a CGI program needs to access a database, the program typically opens a database connection and then closes the connection once it is done. Since opening and closing database connections are expensive operations, these operations may further decrease the performance of the web server each time a CGI program runs. In contrast, application servers may provide a means to pool database connections, thus eliminating or reducing the need to constantly open/close database connections. Also, data access in CGI programs is generally coded at a relatively low level, e.g., using a specific dialect of SQL to access a specific type of database. Thus, portions of the application may need to be recoded if the database is replaced with a new type of database. Application servers, on the other hand, may provide a database service for applications to utilize as an interface between the application and the database, which can serve to abstract the application from a particular type of database.

Application servers may also provide many other types of application services or may provide standard reusable components for tasks that web applications commonly need to perform. Application servers often incorporate these services and components into an integrated development environment specialized for creating web applications. The integrated development environment may leverage various standard software component models, such as the Common Object Request Broker Architecture (CORBA), the (Distributed) Component Object Model (COM/DCOM), Enterprise JavaBeans™ (EJB), etc., or the integrated development environment may provide its own software component model or may extend standard component models in various ways.

The following list is a partial list of the types of application services or application components that application servers may provide. By leveraging these types of integrated, pre-built services and components, web application developers may realize a significant reduction in application development time and may also be able to develop a more robust, bug-free application. Application servers from different vendors differ, of course, in the types of services they provide; thus, the following list is exemplary only.

As noted above, application servers may provide data access services for accessing various types of databases, e.g. through directly supporting proprietary databases, such as SAP, Lotus Notes, PeopleSoft, etc., or through standardized interfaces, such as ODBC, JDBC, etc. Also, as noted above, application servers may enable database connection pooling or caching.

Application servers may also provide services for accessing network directories, such as directories that support the standard Lightweight Directory Access Protocol (LDAP).

Application servers may also provide application security services or components. Web application security may be considered at different levels, such as: client-to-server communication, application-level privileges, database access, directory service access, etc. Application server security-related services/components may include support for performing user authentication, performing data encryption, communicating via secure protocols such as Secure Sockets Layer (SSL), utilizing security certificates, programming user access rights, integrating with operating system security, etc.

Application servers may also provide services enabling a web application to easily maintain user state information during a user session or across user sessions. Performing state and session management is especially important for applications that have complex, multi-step transactions.

Application servers may also support caching the results of application logic execution or caching the results of web page/component output, so that for appropriate subsequent requests, the results may be reused.

Application servers may also support result streaming, such as dynamically streaming HTTP output, which may be especially useful for large result sets involving lengthy queries. A related service may enable an application to easily display a large result set by breaking the result set down into smaller groups and displaying these groups to the user one at a time.

Many web applications need to perform various types of searching or indexing operations. Application servers may also provide application services for indexing or searching various types of documents, databases, etc.

As noted above, many web applications may perform various types of complex, multi-step transactions. Application servers may also provide support for managing these application transactions. For example, this support may be provided via a software component model supported by the application server, such as the Enterprise JavaBeans™ component model, or via integration with third-party transaction process monitors, etc.

It is often desirable to enable web applications to perform certain operations independently, as opposed to in response to a user request. For example, it may be desirable for an application to automatically send a newsletter to users via email at regularly scheduled intervals. Application servers may support the creation and scheduling of events to perform various types of operations.

Many types of web applications need to perform e-commerce transactions, such as credit card transactions, financial data exchange, etc. Application servers may provide services for performing various types of e-commerce transactions or may provide an integrated third-party e-commerce package for applications to use.

Web applications often need to utilize various types of standard network application services, such as an email service, FTP service, etc. Application servers may provide these types of services and may enable applications to easily integrate with the services.

Web applications often need to log various conditions or events. Application servers may provide an integrated logging service for web applications to use.

Judging by the exemplary list above of computing services that application servers may provide for web or other applications, it is apparent that application servers may integrate a diverse range of services, where these services may interact with many different types of servers, systems, or other services. For example, an application server may act as a platform hub connecting web servers, database servers/services, e-commerce servers/services, backend or legacy systems, or any of various other types of systems or services. A key benefit of many application servers is that they not only provide this service/system integration, but typically also provide centralized administrative or management tools for performing various aspects of system and application administration.

For example, application servers may provide management tools related to application development and deployment, such as tools for source code control and versioning, bug tracking, workgroup development, etc. Application servers may also provide tools related to application testing and deployment, such as tools for application prototyping, load simulation, dynamic code base updates, etc. Application servers may also provide tools for easily configuring the application to utilize various of the application server services described above. For example, administrators may use a tool to set the result caching criteria for particular application components or pages, or may use a tool to specify which documents to index or to specify indexing methods, etc.

One important class of application server administrative tools pertains to real-time application management and monitoring. Application servers may provide tools for dynamically managing various factors affecting application performance, e.g., by adjusting the application services and support features described above. For example, application server tools may allow administrators to:

dynamically adjust the number of database connections maintained in a database pool, in order to determine the optimum pool size for maximum performance clear or resize application output caches dynamically change various aspects of system or application security schedule or trigger events, such as events for sending e-mail reports to application users, generating reports based on collected data, etc.

start and stop various application services, such as email or FTP services, from a centralized user interface This list is, of course, exemplary, and particular application servers may support different types of centralized application management.

In addition to the factors discussed above, many application servers also include means for providing various types of system reliability and fault tolerance. One common technique related to fault tolerance is known as application server "clustering". Application server clustering refers to tying together two or more application servers into a system. In some cases, this "tying together" may mean that application code, such as particular software components, is replicated on multiple application servers in a cluster, so that in the case of a hardware or software failure on one application server, user requests may be routed to and processed by other application servers in the cluster.

Application server clustering may also facilitate application performance and scalability. Application servers may be added to a cluster in order to scale up the available processing power by distributing work. Advantageously, application servers often enable this type of scaling up to be down without requiring changes to the application code itself.

Work may be distributed across an application server cluster in different ways. For example, as discussed above, application code may be replicated across multiple application servers in the cluster, enabling a given request to be processed by any of these multiple application servers. Also, application code may be logically partitioned over multiple servers, e.g., so that a particular application server is responsible for performing particular types of operations. This type of application partitioning may help application performance in various ways. For example, application partitioning may reduce the need for an application server to perform context switching between different types of operations, such as CPU-intensive operations versus input/output-intensive operations. Also, application partitioning may be used to match application processing to various physical characteristics of a system, such as network characteristics. For example, data-intensive application logic may be configured to run on an application server that is closest to a data source, in order to reduce the latencies associated with accessing remotely located data.

In the case of application code replication, where multiple application servers are capable of processing a given request, it is often desirable to route the request to the "best" application server currently available to process the request. The "best" application server may, for example, be considered as the application server that will enable the request to be processed and the request results to be returned to the client as quickly as possible. On a broader scale, the "best" application server may be considered as the application server that will enhance some aspect of the performance of the overall application to the greatest possible extent. The mapping of client requests to application servers, which may use various algorithms and techniques, is known as "application server load balancing."

As noted above, application servers may interface with various types of backend systems. For example, many corporations have legacy systems that manage data and transactions, such as a CICS system, an R/3 system, a PeopleSoft system, etc. Application servers may enable the backend system data and transactions to be exposed to the Internet, e.g., the World Wide Web, or to an Intranet without having to rewrite or move the transactions and/or data. For example, a bank may want to allow online banking from the web. However, all the account data and logic may be stored on and accessed through a backend mainframe computer system. Thus, an application server may be employed to interface with the backend system.

One problem encountered by developers of applications that execute on application servers is how to determine and make available the available functionality of the backend system. A backend system may implement one or more programmatically callable functions. For example, a programmatically callable function may comprise a specific stored procedure, a prepared query, a BAPI, an RFC, a psft message, an MQseries message, a CICS txn, etc., depending on the type of backend system.

It can be a time-consuming and difficult task to identify the available functionality of the backend system and create data structures or other information useable to access the backend system functionality from the application server. Therefore a system and method for simplifying and automating this task are desired.

SUMMARY OF THE INVENTION

The problems outlined above may in large part be solved by providing a system and method for automatically creating information useable to access functionality of a backend computer system coupled to an application server. In various embodiments, the backend computer system may be any type of computer system, including various types of legacy or enterprise systems. Examples of particular types of backend systems are discussed, such as a Customer Information Control System (CICS) system, an R/3 system, a PeopleSoft system, etc.

The method may operate to connect, e.g., via a network, to the backend computer system coupled to the application server. For example, the backend system may provide an interface enabling a client computer to log in to the backend system. Information indicative of functionality of the backend system may then be obtained. In various embodiments, various types of information may be obtained, and the information may be formatted in any of various ways. For example, techniques for obtaining the information and the type of information obtained may depend on the particular type of backend system or the functionality associated with the backend system. In one embodiment, the backend system may implement one or more programmatically callable functions, and information specifying these functions may be obtained. Examples of programmatically callable functions associated with various types of backend systems include: a specific stored procedure, a prepared query, a BAPI, an RFC, a psft message, an MQseries message, a CICS txn, etc.

The method may operate to programmatically analyze the information obtained from the backend system and automatically, i.e., programmatically, create information based on the analysis, wherein the programmatically created information is useable for accessing the functionality of the backend system. For example, where the functionality comprises a programmatically callable function, the information created may include information specifying the function name, names of input and output parameters, data types of the parameters, etc.

In one embodiment, programmatically creating this information may comprise creating metadata that abstractly specifies the functionality of the backend system. For example, the application server may be coupled to different types of backend systems, wherein each system supports a different communication protocol, implements different types of functions and data types, etc. However, for each of the various backend systems, information useable for accessing functionality of the respective system may be created according to a common model or format. In one embodiment, the information may be created in an Extensible Markup Language (XML) format. Using a common or uniform format in this way may allow the application server to provide application server developers with a common API for use in accessing different types of backend systems connected to the application server.

The programmatically created information may be stored in a repository for use in accessing the functionality of the backend computer system from the application server. The repository may be implemented in any of various ways, e.g., as a database or file system, and is preferably operable to persistently store the information.

In one embodiment more than one backend system may be connected to the application server, wherein the backend systems are of the same or different types. Thus, the method may be performed for each backend system, to automatically create information enabling the application server to access functionality associated with each of the systems.

The programmatically created information may then be used for accessing the backend system from the application server. The information may be retrieved from the repository. For example, a portion of the information corresponding to a desired function of the backend system to invoke may be retrieved from the repository. The retrieved information may be used to programmatically construct appropriate data structures and/or execute appropriate code for interfacing with the backend system to access the desired functionality. For example, the backend system may provide an interface which allows client computers to connect to the backend system and invoke functionality of the backend system, e.g., to call a function, request storage of data, etc. In one embodiment, the retrieved information may be used to marshal data into a request buffer to send to the backend system. For example, as described above, where the functionality of the backend system to be invoked comprises a programmatically callable function, the information may specify the function name, function parameters, etc. Thus, the information may be used in determining data types into which parameter values must be translated, determining the order in which to write the parameters into the request buffer, etc.

In one embodiment, the application server may support an application programming interface (API) that allows programs that execute on the application server to access functionality of backend systems connected to the application server. The application server may implement a framework operable to use the programmatically created information to programmatically access desired functionality of the backend system from the application server. One embodiment of such a framework is discussed.

BRIEF DESCRIPTION OF THE DRAWINGS

A better understanding of the present invention can be obtained when the following detailed description is considered in conjunction with the following drawings, in which:

FIG. 3 is a block diagram illustrating one embodiment of an application server and processes that run on the application server;

Figure 1:
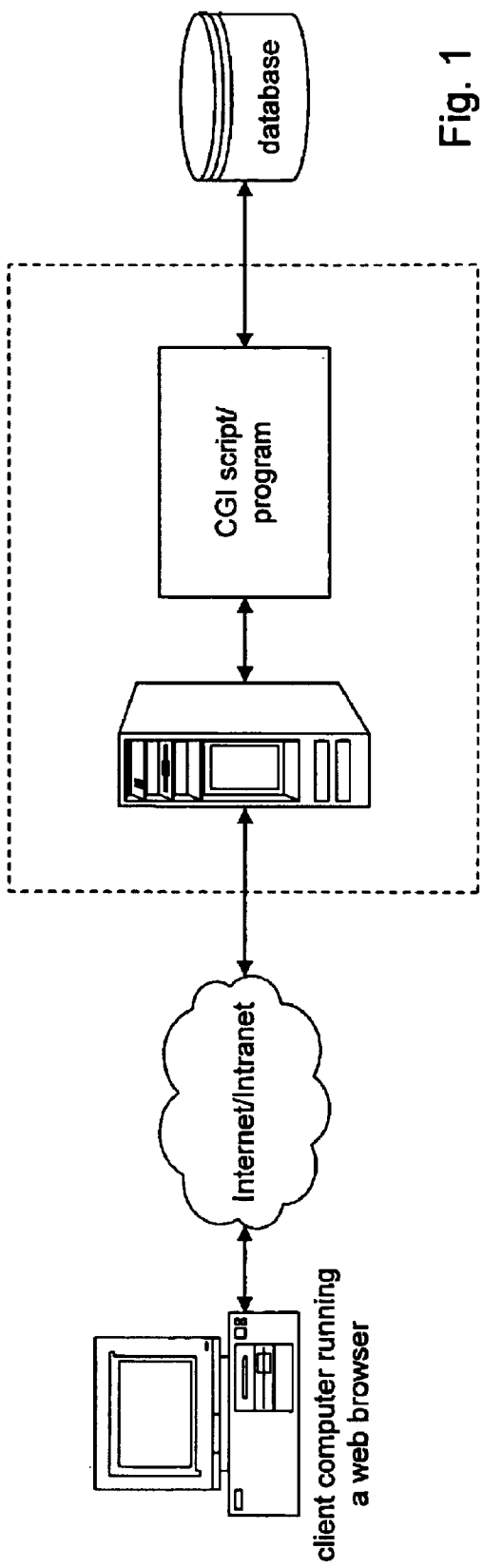
FIG. 1 illustrates a typical architecture for a web application utilizing CGI scripts or programs.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 2—Exemplary Application Architectures

Figure 2A:
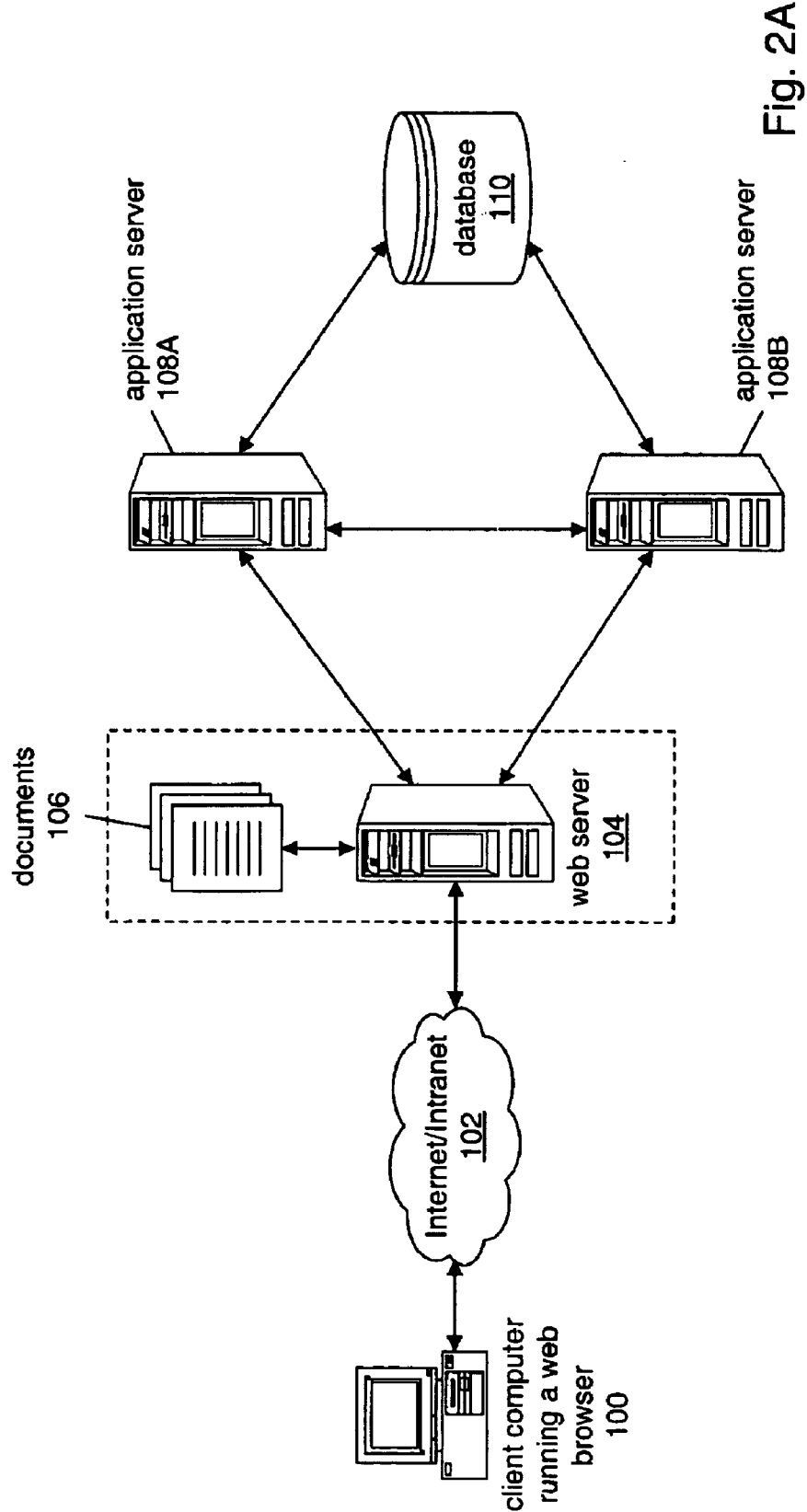
FIGS. 2A–2C illustrate exemplary architectures for networked applications running on application servers.
Figure 2B:
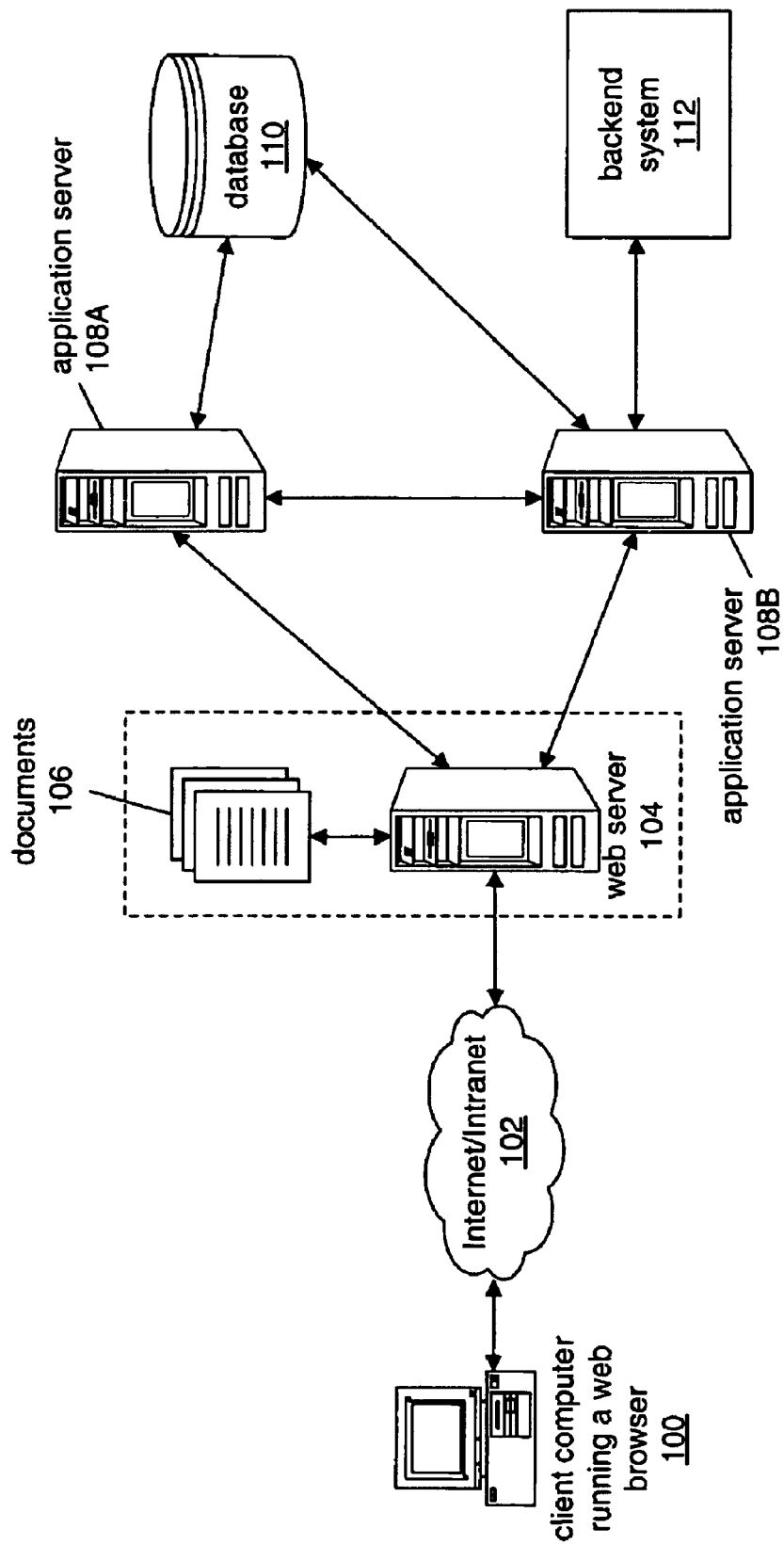
Figure 2C:
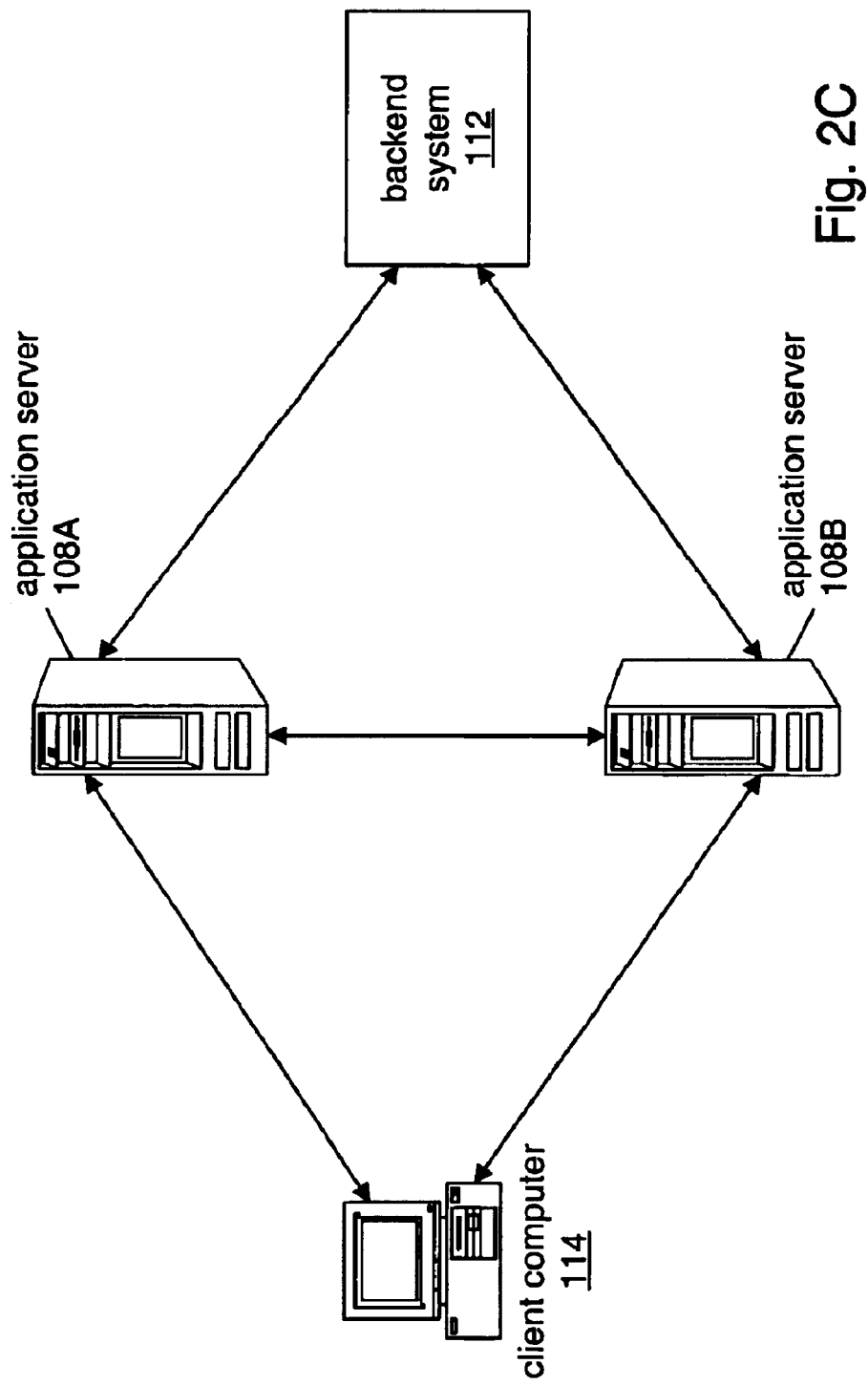

FIGS. 2A–2C illustrate exemplary architectures for networked applications running on application servers. There are, of course, many possible architectural variations, and FIGS. 2A–2C are exemplary only.

FIG. 2A illustrates an exemplary architecture for a web application. In general, a web application may be defined as an Internet or Intranet-based application comprising a collection of resources that are accessible through uniform resource locators (URLs). The resources may include web pages comprising HTML, XML, scripting code such as Javascript or VBScript, or other types of elements. The resources may also include any of various types of executable programs or components, such as CGI programs, Java servlets, JavaBeans components, CORBA components, downloadable code such as Java classes or ActiveX components, etc. The resources may also include any other type of resource addressable through a URL.

The embodiment of FIG. 2A illustrates a client computer 100 running a web browser, such as the Netscape Navigator or Microsoft Internet Explorer web browsers. It is noted that the web-browser need not be a web browser per se, but may be any of various types of client-side applications that include web-browsing functionality. For example, Microsoft Corp. provides programming interfaces enabling applications to incorporate various web-browsing capabilities provided by the Microsoft Internet Explorer code base.

The web browser may run in any type of client computer 100. For example, the web browser may run in a desktop computer or workstation running any of various operating systems, such as Windows, Mac OS, Unix, etc., or the web browser may run in a portable computing device, such as a personal data assistant, smart cellular phone, etc. The client computer 100 may use a network connection for communicating with a web server 104 via a network 102, such as the Internet or an Intranet. The client network connection may be a connection of any type, such as a PPP or SLIP dialup link, an Ethernet or token ring connection, an ISDN connection, a cable modem connection, any of various types of wireless connections, etc. Although web applications are often associated with particular communication protocols, such as HTTP or SSL, it is noted that any communication protocol, including TCP-based protocols and UDP-based protocols, may be used to communicate over the network 102.

As the web server 104 receives a request from a client computer 100, the web server may treat the request differently, depending on the type of resource the request references. For example, if the request references a document 106, such as an HTML document, then the web server may process the request itself, e.g., by retrieving the document from the web server's local file system or from a local cache and returning the document to the client computer. For other types of requests, e.g., requests referencing executable components, such as Java servlets, JavaBeans components, C program modules, CORBA components, etc., the web server may broker the request to an application server 108. For example, as shown in FIG. 2A, there may be a plurality of application servers 108, and the web server may select an application server to which to broker the request, e.g., using load balancing techniques. The web server 104 may interface with an application server 108 using various techniques, e.g., through an in process extension, such as an ISAPI or NSAPI extension.

The application server 108 may be configured as a part of an application server cluster, as described above and shown in FIG. 2A. Although FIG. 2A illustrates an application server cluster with only two application servers, it is noted that the cluster may comprise any number of application servers. Each application server may interface with various types of other servers or systems. For example, as illustrated in FIG. 2A, the application servers may communicate with a database 110. Each application server in the cluster may interface with the same systems, or the application servers may differ in which systems they interface with. For example, FIG. 2B is similar to FIG. 2A, but in the embodiment of FIG. 2B, application server 108B is shown to interface with a backend system 112, e.g., a CICS, R/3, PeopleSoft, or other type of backend system. Application servers in a cluster may not need to be in close physical proximity to each other.

It is noted that, in alternative embodiments, a client computer may communicate directly with an application server or application server cluster, without interfacing through a web server. FIG. 2C illustrates an example of a client computer 114 communicating directly with application server(s) 108. For example, the application servers may run an enterprise resource planning application, and the client computer 114 may be a computer within the enterprise that is connected to the application servers 108 via a WAN. In this example, the client computer may run "thick client"

software, e.g., client software that comprises a portion of the enterprise resource planning application logic. The client computer software may interface directly with executable programs or components running on the application servers, e.g., through a protocol such as the Internet Inter-Orb Protocol (IIOP).

As shown, the application server(s) 108 may also interact with a backend system 112, such as a CIS, R/3, PeopleSoft, or other type of backend system. For example, the backend system 112 may be responsible for managing enterprise data or performing business functions for the enterprise.

As noted above, FIGS. 2A–2C are exemplary architectures only, and many variations are possible. As a small handful of examples of alternative embodiments, multiple web servers may be present to receive requests from client computers and broker the requests to application servers, the web server may itself interface directly with a database, application servers may interface with various other types of systems, such as specialized authentication servers, e-commerce servers, other types of legacy systems, etc.

FIG. 3—Service and Component Management

Applications that run on application servers are often constructed from various types of software components or modules. These components may include components constructed according to a standard component model. For example, an application may comprise various types of standard Java™ components such as Enterprise Java-Beans™ components, JavaServer Pages™, Java Servlets™, etc. An application may also comprise any of various other types of components, such as Common Object Request Broker Architecture (CORBA) components, Common Object Model (COM) components, or components constructed according to various proprietary component models.

Each request that an application server receives from a client may reference a particular application component. Upon receiving a request, the application server may determine the appropriate component, invoke the component, and return the execution results to the client. Some application components may reference functionality of a backend system coupled to the application server. In one embodiment, the application server may utilize information stored in a repository to access functionality of the backend system, as described in detail below.

In various embodiments, it may be necessary or desirable for different types of application server components to run within different environments. For example, an application server may support both components written using the Java™ programming language and components written using the C or C++ programming languages. In such a case, the different types of components may be managed by particular processes or engines.

For example, FIG. 3 illustrates an application server 200 in which a process referred to as the "executive server" 202 runs. As shown, the executive server 202 interfaces with a process 204, referred to as a "Java server" and a process 206 referred to as a "C/C++server". In this embodiment, the executive server 202 may receive client requests, assign the client requests to a particular thread, and forward the requests to either the Java server 204 or the C/C++ server 206, depending on whether the requests reference a component that executes within a Java runtime environment or a C/C++ runtime environment. The Java server or C/C++ server may then load and execute the appropriate component or module.

In addition to interfacing with the Java and C/C++ servers, the executive server 202 may also manage various system-level services. For example, as discussed below, the executive server may manage a load balancing service for distributing requests to other application server computers in a cluster, a request manager service for handling incoming requests, a protocol manager service for communicating with clients using various protocols, an event logging service for recording conditions or events, etc.

In addition to managing application components, the Java server 204 and the C/C++ server 206 may also host and manage various application-level services used by the application components. These application-level services may include services for managing access to databases and pooling database connections, services for performing state and session management, services for caching output results of particular application components, services for communicating with backend systems, or any of various other services such as described above.

FIG. 3 also illustrates a process 208 referred to as the "administrative server". As described above, an application server environment may provide an administrative tool for adjusting various factors affecting application execution and performance. In the embodiment of FIG. 3, such an administrative tool may interface with the administrative server 208 to adjust these factors. For example, the administrative tool 208 may be enabled to adjust the event logging criteria used by the executive server's event-logging service, adjust the number of database connections pooled by the Java or C/C++ server's data access service, etc. The administrative server 208 may also provide failure recovery by monitoring the executive server, Java server, and C/C++ server processes and restarting these processes in case of failure.

FIG. 3 of course represents an exemplary architecture for managing application components, system-level services, and application-level services, and various other embodiments are contemplated. For example, although FIG. 3 is discussed in terms of Java™ and C/C++ components, various other processes or engines may be present for executing other types of software components or modules. Also, various embodiments may support multiple component management processes, e.g., multiple Java server processes or C/C++ server processes. The number of processes may be adjusted via an administrative tool interfacing with the administrative server.

Figure 4:
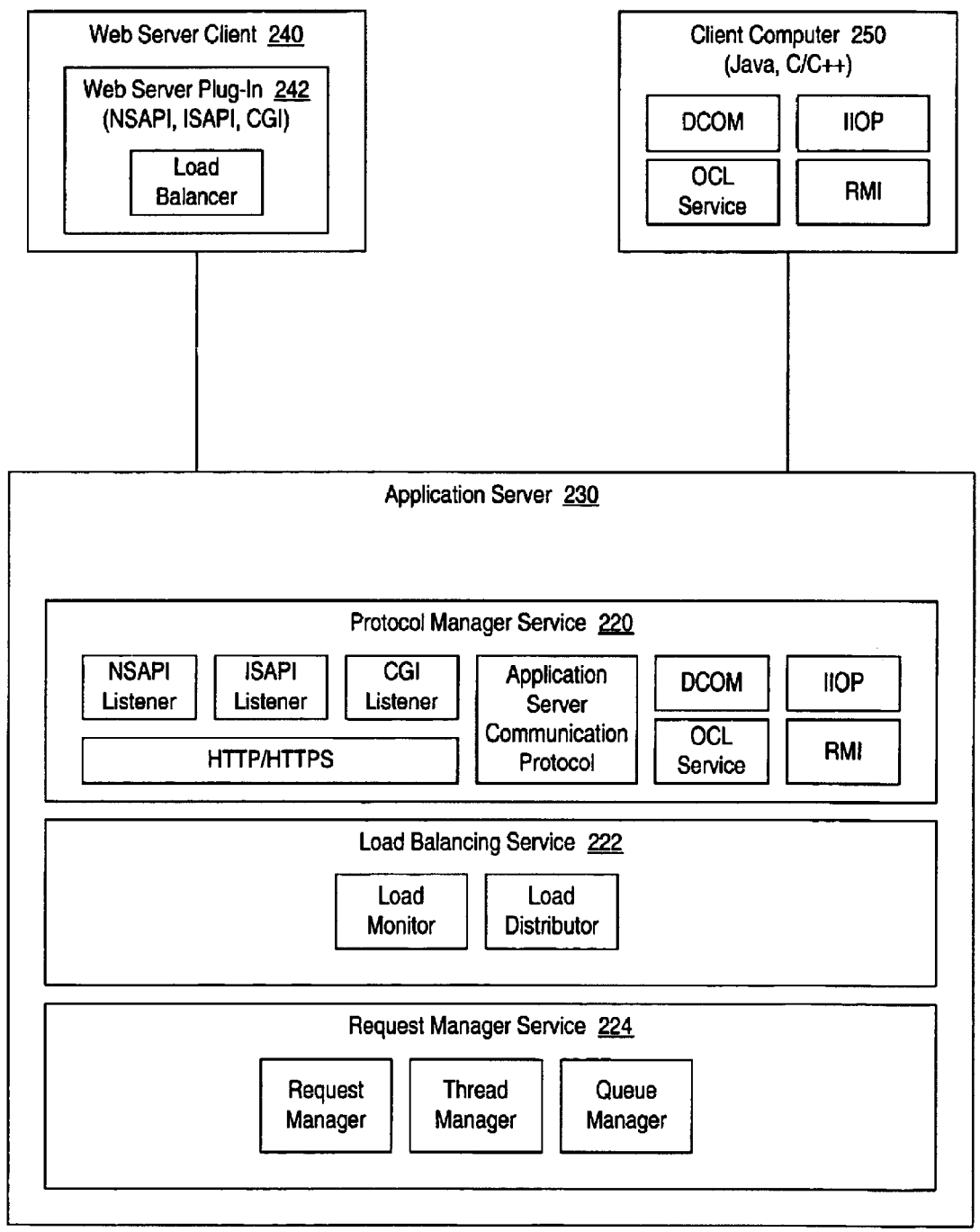
FIG. 4 illustrates several system-level services that may be involved in managing application server requests.

FIG. 4—Application Server System-Level Services

FIG. 4 illustrates several exemplary system-level services which may be involved in managing application server requests. In one embodiment, these system-level services may be managed by an executive server process such as described above with reference to the FIG. 3 application server.

FIG. 4 illustrates a protocol manager service 220. The protocol manager service 220 is responsible for managing network communication between the application server 230 and clients of the application server. For example, FIG. 4 illustrates a web server client 240 which comprises a standard web server extension or plug-in 242. The web server plug-in 242 may be any of various well-known types of plug-ins enabling web servers to communicate with other systems, including NSAPI, ISAPI, optimized CGI, etc. As shown, the protocol manager service 220 includes "listener" modules or components, e.g., an NSAPI listener, ISAPI listener, etc., for communicating with the web server plug-in. The listener modules may communicate with the web server plug-in via the standard HTTP or HTTPS protocols.

FIG. 4 also illustrates that other types of clients besides web servers may communicate with the application server 230. For example, a client computer 250 is shown. The client computer 250 may run an application program, such as a program written in Java™ or C++, that communicates with the application server 230 using any of various communication protocols. For example, as shown in FIG. 4, the protocol manager service 220 may support such protocols as IIOP, RMI, DCOM, OCL Service, or any of various other protocols. As an example, an administration program for configuring an application server may communicate directly with the application server 230 through such a protocol, rather than routing requests through a web server.

As shown in FIG. 4, an application server may also include a load balancing service 222. In the case of application server clustering, requests may first be processed by the load balancing service in order to determine whether the request should be processed by the current application server or would be better served by forwarding the request to another application server in the cluster.

As shown in FIG. 4, an application server may also include a request manager service 224. Once the load balancing service determines that the current application server should process the client request (if load balancing is applicable), the request manager service is responsible for managing the processing of the request. As shown in FIG. 4, the request manager service 224 may include several components or modules, such as a request manager, a thread manager, and a queue manager. In one embodiment, client requests may be processed in a multi-threaded fashion. The thread manager module may manage a pool of threads available for processing requests. In one embodiment, the number of threads in the pool may be adjusted using an administrative tool.

When the request manager module receives a client request, the request manger module may call the thread manager module to attempt to assign the client request to a thread. If no threads are currently available, then the request manager module may call the queue manager module to queue the request until a thread becomes available. The queue manager module may maintain information regarding each client request, such as the request ID, the processing status, etc.

Figure 5:
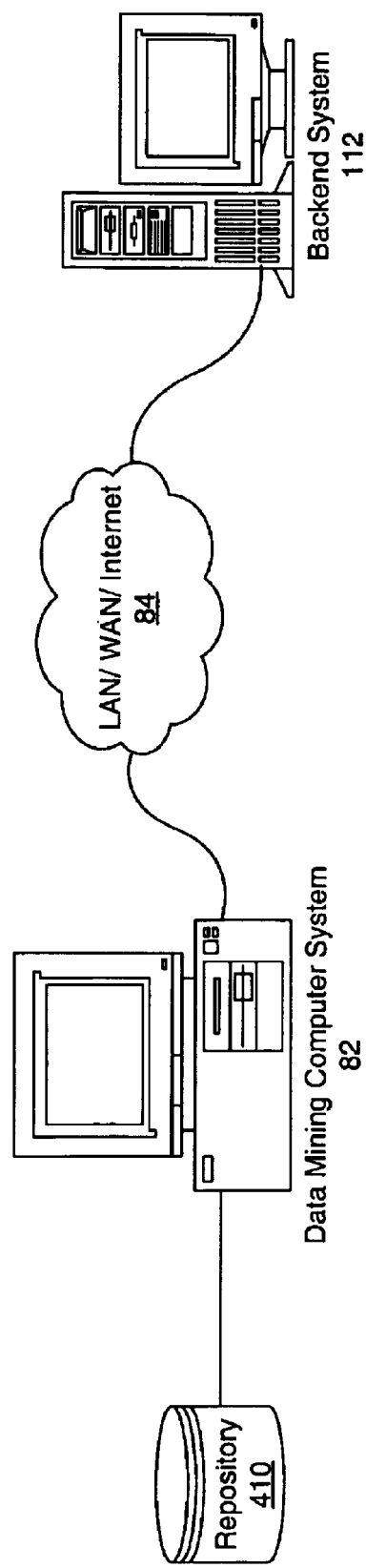
FIG. 5 illustrates one embodiment of a system including a data mining computer system connected via a network to a backend system.

FIG. 5—Data Mining Computer System Connected to a Backend Computer System

As described above, it may be desirable to provide a system for automatically determining functionality of a backend computer system coupled to an application server (s) and enabling the application server(s) to access the functionality of the backend computer system. FIG. 5 illustrates one embodiment of a system including a data mining (client) computer system 82 connected via a network 84 to a backend system 112. As described in detail below, the data mining computer system 82 may be operable to connect to the backend system 112 to determine functionality of the backend system 112 and store information regarding this functionality in a repository 410.

The data mining computer system 82 may be a computer system of any type and may be the application server computer itself or may be a separate computer. Defined broadly, a computer system may refer to any system operable to execute program instructions from a memory medium. As examples, in various embodiments, the data mining computer system 82 may comprise a personal computer, a workstation, a network computer, etc.

The data mining computer system 82 may be connected to a network 84. The network 84 may be any type of network, including the Internet, an Intranet, a LAN, or a WAN, among others. As shown, a backend system 112 may also be connected to the network 84. The network 84 enables the data mining computer system 82 and the backend system 112 to communicate with each other. For example, in one embodiment, the network 84 may be the Internet, and the systems may communicate using a TCP and/or IP-based protocol.

The backend system 112 may be a computer system of any type, such as an enterprise or legacy system. For example, the backend system 112 may comprise a CICS system, an R/3 system, a PeopleSoft system, or any of various other types of systems. In various embodiments, the backend system 112 may implement any of various types of functionality. For example, the backend system 112 may implement various types of programmatically callable functions.

The data mining (client) computer system 82 may execute software operable to connect to the backend system 112 and receive information specifying the functionality of the backend system 112. As described below, these operations may be performed in any of various ways. The data mining computer system 82 may then analyze the received information and programmatically create information based on the analysis, wherein the programmatically created information is useable for accessing the functionality of the backend computer system from the application server.

The data mining computer system 82 may persistently store the programmatically created information in a repository 410. The repository 410 may be implemented in any of various ways, e.g., as a database or file system. One or more application server computers may then obtain information stored in the repository 410, for use in accessing functionality of the backend system 112.

Figure 6:
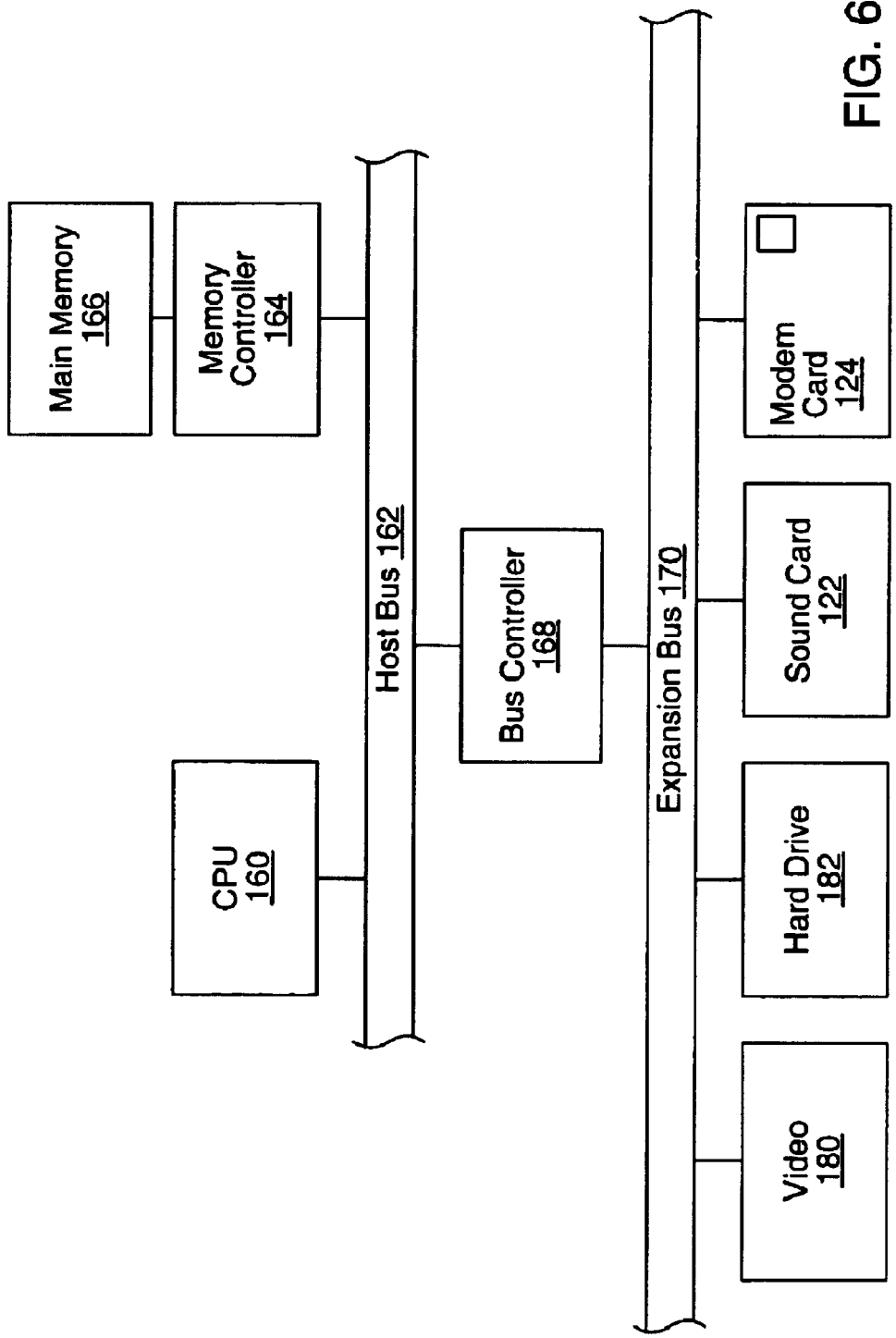
FIG. 6 is a block diagram illustrating one embodiment of the data mining computer system shown in FIG. 5.

FIG. 6—Data Mining Computer System Block Diagram

FIG. 6 is a block diagram illustrating one embodiment of the data mining computer system 82 shown in FIG. 5. Elements of a computer not necessary to understand the present disclosure have been omitted for simplicity. It is noted that any type of computer system configuration or architecture can be used as desired, and FIG. 6 illustrates a representative PC embodiment. Also, as noted above, the data mining computer system may be the application server computer itself, for which access to functionality of the backend system 112 is desired, or may be a separate computer operable to store information regarding functionality of the backend system 112 in a repository accessible from the application server computer.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The host bus 162 is coupled to an expansion or input/output bus 170 by means of a bus controller 168 or bus bridge logic. The expansion bus 170 may be any type of bus, including the PCI (Peripheral Component Interconnect) expansion bus. The expansion bus 170 includes slots for various devices such as the sound card 122 and the modem card 124. The computer further includes a video display subsystem 180 and hard drive 182 coupled to the expansion bus 170.

The main memory 166 may store operating system software as well as other software for operation of the computer system. The main memory 166 may also store a computer program operable to perform one or more of the methods described below, e.g., to store information regarding functionality of a backend computer system in a repository and/or to retrieve the information from the repository for use in accessing the functionality of the backend system from an application server.

Computer programs operable to perform the methods described below may also be stored on other types of memory media. The term "memory medium" is intended to include an installation medium, e.g., a CD-ROM, floppy disks, or tape device, a computer system memory or random access memory such as DRAM, SRAM, EDO RAM, etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide the program instructions to the first computer for execution.

Figure 7:
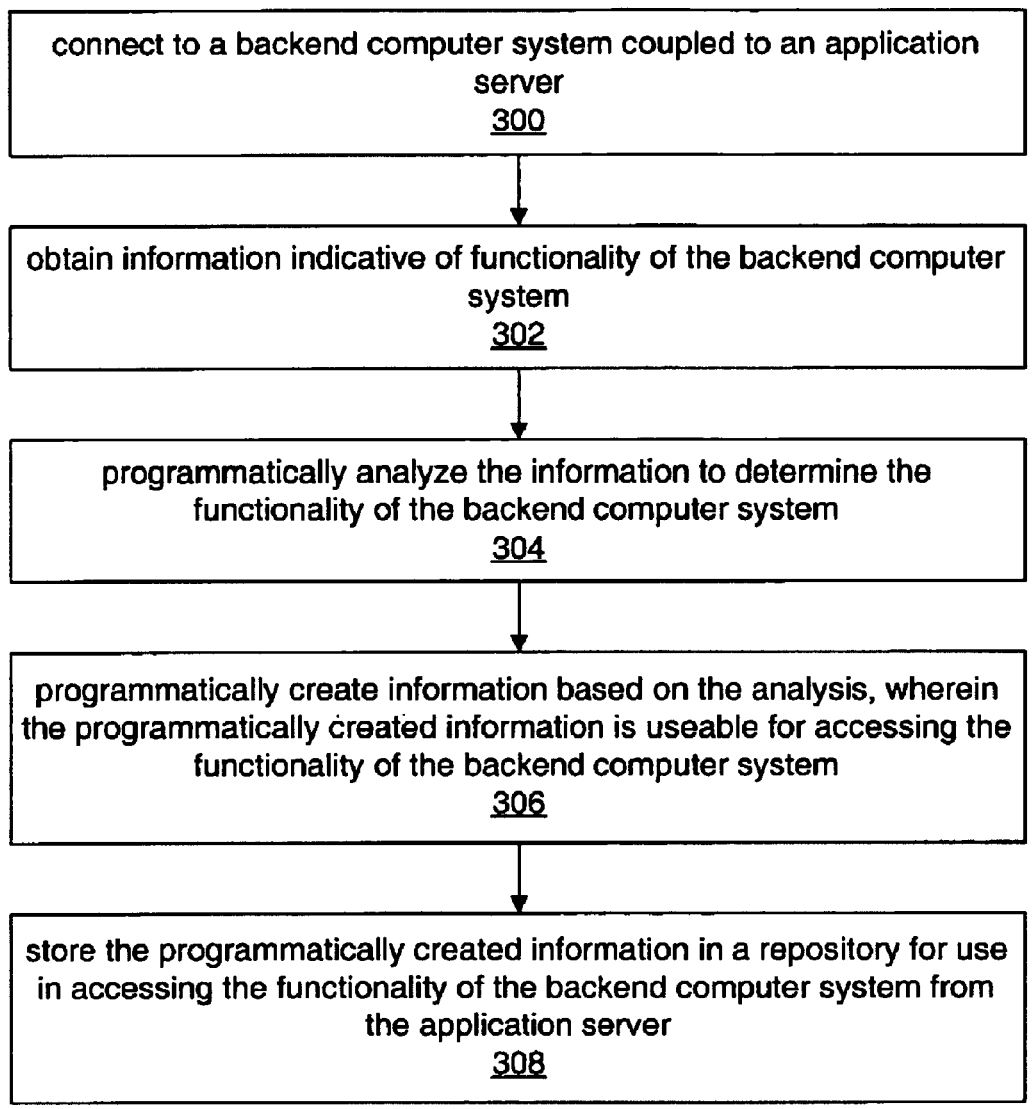
FIG. 7 is a flowchart diagram illustrating one embodiment of a method for automatically creating information useable to access functionality of a backend computer system coupled to an application server.
Figure 8:
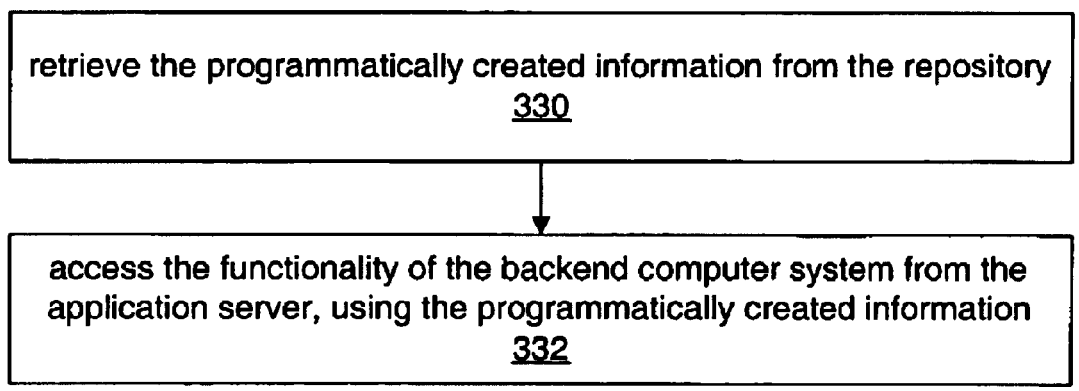
FIG. 8 is a flowchart diagram illustrating one embodiment of a method for using programmatically created information to access a backend system from an application server.

FIGS. 7 and 8—Methods for Accessing Functionality of a Backend Computer System Coupled to an Application Server FIG. 7 is a flowchart diagram illustrating one embodiment of a method for automatically creating information useable to access functionality of a backend computer system coupled to an application server. In various embodiments, the backend computer system may be any type of computer system, including various types of legacy or enterprise systems. Examples of particular types of backend systems are discussed.

In step 300, the method may operate to connect, e.g., via a network, to the backend computer system coupled to the application server. For example, the application server computer itself or a separate computer may connect to the backend system, e.g., as shown by the data mining computer system 82 connecting to the backend system 112 via the network 84 in FIG. 5. The implementation of step 300 may depend on the particular type of backend system. For example, the backend system may provide an interface enabling a client computer to log in to the backend system. As examples, for a Customer Information Control System (CICS) or R/3 backend system, step 300 may comprise logging in to the system, or for a PeopleSoft backend system, step 300 may comprise logging in to a PeopleSoft database.

In step 302, the method may operate to obtain information indicative of functionality of the backend system. In various embodiments, the information may comprise information of any of various types, in any of various formats, and may be obtained in any of various ways. For example, the implementation of step 302 may depend on the particular type of backend system or the functionality associated with the backend system.

In one embodiment, the backend system may implement one or more programmatically callable functions, and step 302 may comprise obtaining information specifying these functions. Examples of programmatically callable functions associated with various types of backend systems include: a specific stored procedure, a prepared query, a BAPI, an RFC, a psft message, an MQseries message, a CICS txn, etc. For example, for an R/3 system, step 302 may comprise calling an application programming interface (API) provided by the R/3 system to obtain the information specifying the functions. The API may also be employed to determine input and output parameters for the functions. As another example, for a PeopleSoft system, step 302 may comprise executing database queries to determine programmatically callable functions or stored procedures.

The information obtained from the backend system in step 302 may be returned to the client computer that connected to the backend system, and in step 304, the information may be programmatically analyzed to determine the functionality of the backend computer system. As used herein, programmatically analyzing the information may include any technique or method implemented by a program that inspects or examines the information to determine the functionality of the backend computer system. For example, for the R/3 and PeopleSoft examples above, the received information may directly specify functions available on the backend system, may specify input and/or output parameters associated with the functions, etc. In these examples, analyzing the information may comprise parsing the information according to the format in which the information was returned, e.g., to create data structures representing the functions.

In other embodiments, analyzing the information may be a more complex process. For example, for a CICS system, step 302 may comprise obtaining one or more COBOL program files for programs that execute on the CICS system, e.g., by retrieving the files using the File Transfer Protocol (FTP). The COBOL files may include source code or executable code, and in step 304 this code may be analyzed to determine functions and their associated parameters which the COBOL programs implement. In one embodiment, the results of the analysis may be outputted in Interface Definition Language (IDL) format. As described below, the IDL may then be converted to a different format if desired.

In step 306, the method may operate to automatically, i.e., programmatically, create information based on the analysis performed in step 304, wherein the programmatically created information is useable for accessing the functionality of the backend system. For example, where the functionality comprises a programmatically callable function, the information created in step 306 may include information specifying the function name, names of input and output parameters, data types of the parameters, etc. It is noted that in one embodiment, the steps of analyzing the information obtained from the backend system and programmatically creating new information based on the analysis may be performed together or may be interleaved.

The application server may implement a framework operable to use the information created in step 306 to programmatically invoke desired functionality of the backend system. Thus, step 306 may comprise programmatically creating any of various types of information or information formatted in any of various ways, e.g., depending on the implementation of the framework that uses the created information. One particular embodiment of a framework operable to use the information programmatically created in step 306 to access functionality of the backend system is discussed below.

In various embodiments, step 306 may comprise creating metadata that abstractly specifies the functionality of the backend system. For example, the application server may be coupled to different types of backend systems, wherein each system supports a different communication protocol, implements different types of functions and data types, etc. However, for each of the various backend systems, information useable for accessing functionality of the respective system may be created according to a common model or format. In one embodiment, the information may be created in an Extensible Markup Language (XML) format. Using a common format in this way may allow the application server to provide application server developers with a common API for use in accessing different types of backend systems connected to the application server.

The information created in step 306 may be grouped into one or more logical "units of interaction". When accessing the functionality of the backend system, the application server may reference individual units of interaction to access the desired functionality. For example, where the backend system implements programmatically callable functions, individual units of interaction may represent individual functions.

In step 308, the information programmatically created in step 306 may be stored in a repository for use in accessing the functionality of the backend computer system from the application server. The repository may be implemented in any of various ways, e.g., as a database or file system, and is preferably operable to persistently store the information.

In one embodiment more than one backend system may be connected to the application server, wherein the backend system are of the same or different types. Thus, method may be performed for each backend system, to automatically create information enabling the application server to access functionality associated with each of the systems. As noted above, in one embodiment, the information created for each backend system may be stored according to a common model or format.

It is noted that the flowchart of FIG. 7 represents one embodiment, and numerous variations are contemplated. As one example, in one embodiment, the method may enable the user to specify only a portion of the functionality of the backend system for which access from the application server is desired. For example, referring again to the R/3 backend system example discussed above, a list of programmatically callable functions available on the R/3 system may be returned to the client computer. The client computer may then display this list, and the user may select a subset of the functions that the user wishes to be able to call from the application server. Thus, step 306 may comprise programmatically creating information corresponding to only the specified subset of functions. Referring to the CICS example, the user may be able to choose only a subset of COBOL programs implemented on the CICS system to analyze and generate information for in steps 304 and 306, respectively.

Also, in one embodiment, step 302 (obtaining the information specifying the functionality of the backend system) may involve interacting with a user of the client computer. For example, with respect to the R/3 backend system example, in step 302 an API provided by the R/3 system may be invoked to obtain information specifying functions available on the R/3 system. This list may then be returned and displayed to the user. The user may select desired functions from the list, and the method may then invoke the API of the R/3 system to request additional information for each function selected by the user, such as input/output parameter information.

FIG. 8 is a flowchart diagram illustrating one embodiment of a method for using the information programmatically created in step 306 to access the backend system from an application server.

In step 330, the information created in step 306 may be retrieved from the repository. Step 330 may comprise retrieving only a portion of the information created in step 306, e.g., a portion corresponding to a desired function of the backend system to invoke.

In step 332, the retrieved information may be used to access the functionality of the backend system from an application server. The retrieved information may be used to programmatically construct appropriate data structures and/or execute appropriate code for interfacing with the backend system to access the desired functionality. For example, the backend system may provide an interface which allows client computers to connect to the backend system and invoke functionality of the backend system, e.g., to call a function, request storage of data, etc. In one embodiment, the retrieved information may be used to marshal data into a request buffer to send to the backend system. For example, as described above, where the functionality of the backend system to be invoked comprises a programmatically callable function, the information may specify the function name, function parameters, etc. Thus, the information may be used in determining data types into which parameter values must be translated, determining the order in which to write the parameters into the request buffer, etc.

In one embodiment, the application server may support an API which allows programs that execute on the application server to access functionality of backend systems connected to the application server. Thus, steps 330 and 332 may be performed in response to a program calling this API.

Figure 9:
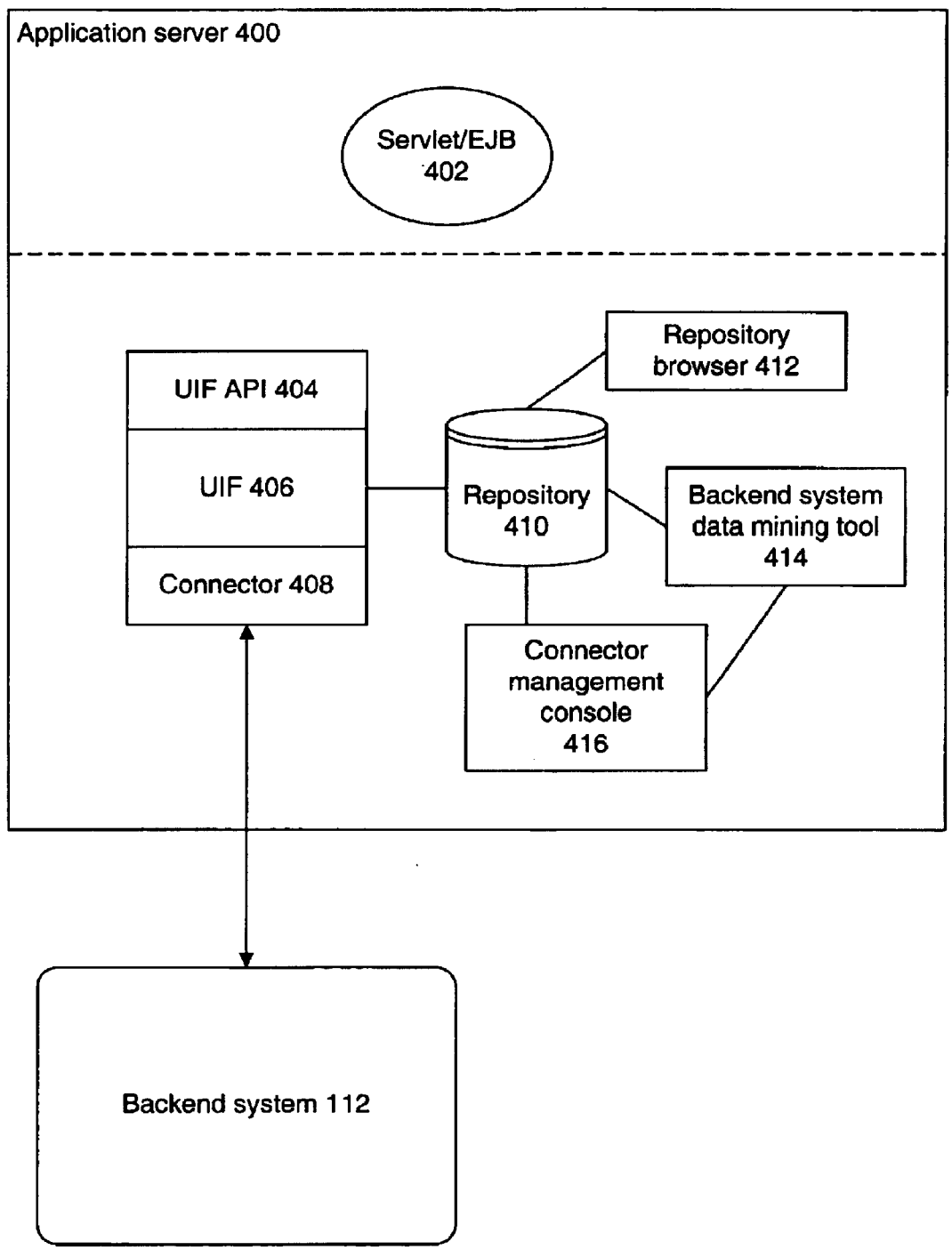
FIG. 9 illustrates an exemplary architecture for an application server operable to access a backend system using programmatically created information.
Figure 10:
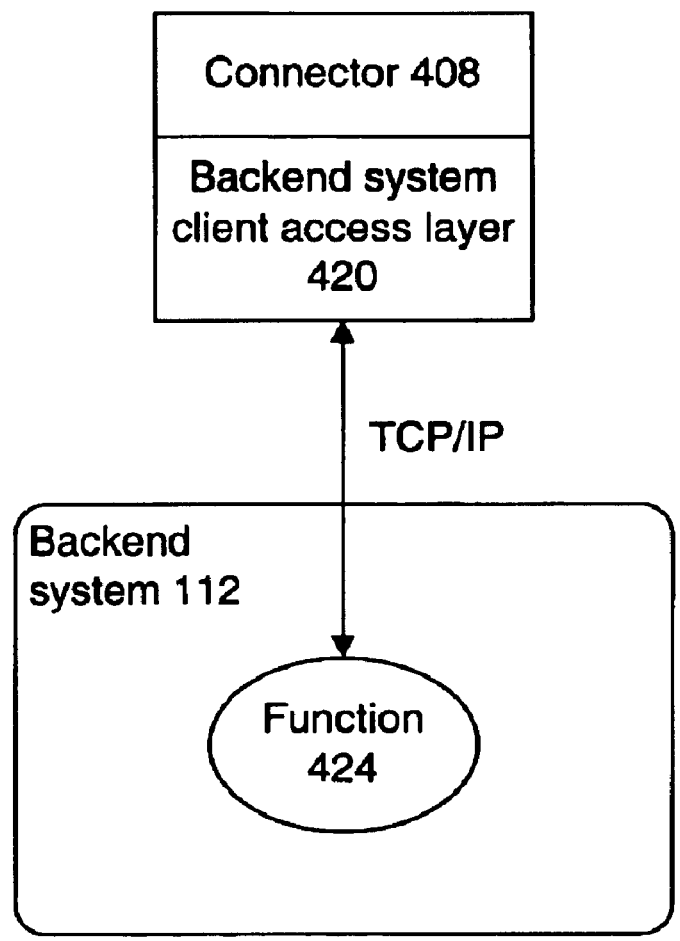
FIG. 10 illustrates in detail an interface between an application server connector module and a backend system.

FIGS. 9 and 10—Exemplary Application Server Architecture

FIG. 9 illustrates an exemplary architecture for an application server 400 operable to access a backend system 112 according to the methods described above. As discussed above, the application server 400 may execute software programs or components, e.g., in response to user requests received, such as requests originating from web users. The application server 400 may execute any of various types of software programs, modules or components. For example, as shown in FIG. 9, the application server 400 may execute a Java Servlet or Enterprise JavaBeans (EJB) component 402.

The component 402 may need to access functionality of the backend system 112. As an example, the application server 400 may enable online Internet banking transactions to be performed, wherein the banking data and transactions are managed by a legacy system 112, e.g., a CICS system. The legacy system 112 may implement, for example, a function for obtaining account data for a particular customer, and the component 402 may call this function to access the legacy system.

The application server 400 may provide a framework referred to herein as a Unified Integration Framework (UIF) 406 which the component 402 may utilize in accessing the backend system 112. In essence, the UIF 406 understands and interprets information stored in the repository 410. The component 402 may call a UIF application programming interface (API) 404. For example, as described above, the UIF API 404 may provide a common API for application server components to uniformly access various types of backend systems. Thus, the UIF may support abstractions for units of interaction stored in the repository 410, may provide common interaction model and communication models for various types of backend systems, etc.

FIG. 9 also illustrates a repository 410 in which information useable for accessing the backend system 112 is stored. In addition to storing information regarding specific functionality of the backend system 112, such as individual functions, the repository 410 may also store other types of information needed to access the backend system 112, such as connection definitions, information regarding datatypes supported by the backend system 112, etc. Thus, in addition to storing information regarding units of interaction (e.g., specific backend system functions), the repository 410 may also store information specifying data type definitions, inheritance and encapsulation relationships between datatypes, etc.

As shown, the architecture may also include a connector 408. The connector 408 may be specific to the particular backend system 112. For example, the connector 408 may be responsible for the logic of how to translate information stored in the repository 410 in a common or uniform format into the format expected by the backend system 112. The connector 408 may provide translation, data marshalling, and network communication services between the UIF 406 and the specific backend system 112. Thus, there may be a different connector 408 for each backend system 112 coupled to the application server 400.

FIG. 9 also illustrates various tools usable for managing and viewing repository information. For example, a repository browser 412 may be provided that allows the user to view the contents of the repository. This ability may enable application server developers to discover backend system functionality available for access. The repository browser 412 may also enable users to import and export files to/from the repository. For example, this ability may allow information to be exported from a first repository and imported to a second repository, e.g., to allow application servers at different geographic locations to access the same backend system.

A connector management console 416 may also be provided that allows the user to browse or change the configuration information for the connector 408. Thus, each connector 408 may have its own respective connector management console 416. The connector management console 416 may also enable the user to monitor backend system status.

A backend system data mining tool 414 may also be associated with the connector management console 416. The backend system data mining tool 414 may implement the method of FIG. 7, to determine available functionality of the backend system 112 and to create and load information into the repository 410, e.g., wherein the information is logically divided into units of interaction (e.g., function objects) corresponding to the functionality of the backend system. The application server components 402 may then use these units of interaction in accessing the backend system 112, as described above.

Thus, for example, if a new backend system is connected to the application server, a user may execute the data mining tool to connect to the new backend system and automatically discover functionality of the new backend system and store information useable for accessing this functionality in the repository 410.

It is noted that in various embodiments, various components of FIG. 9, such as the repository 410 and the backend system data mining tool 414 may or may not be specifically associated with a particular application server computer 400. For example, in one embodiment, the repository information may be stored on a file system of the application server computer. In another embodiment, the repository information may be stored in a separate database computer. In this latter embodiment, for example, multiple application server computers in an application server cluster may use the repository information. Similarly, the backend system data mining tool 414 and other tools may execute on an application server computer or on a separate computer.

FIG. 10 illustrates the interface between the connector 408 and the backend system 112 in more detail. The connector 408 may communicate with the backend system 112 using a connection, such as a TCP/IP connection. As shown, the connector 408 may use a backend-specific client access layer 420 to supply the connection. The connection protocol between the backend system client access layer and the backend system 112 may be specific to the particular backend system 112. The UIF 406 may maintain a connection pool for each backend system 112, and each connection may be reused for multiple application requests.

Figure 11:
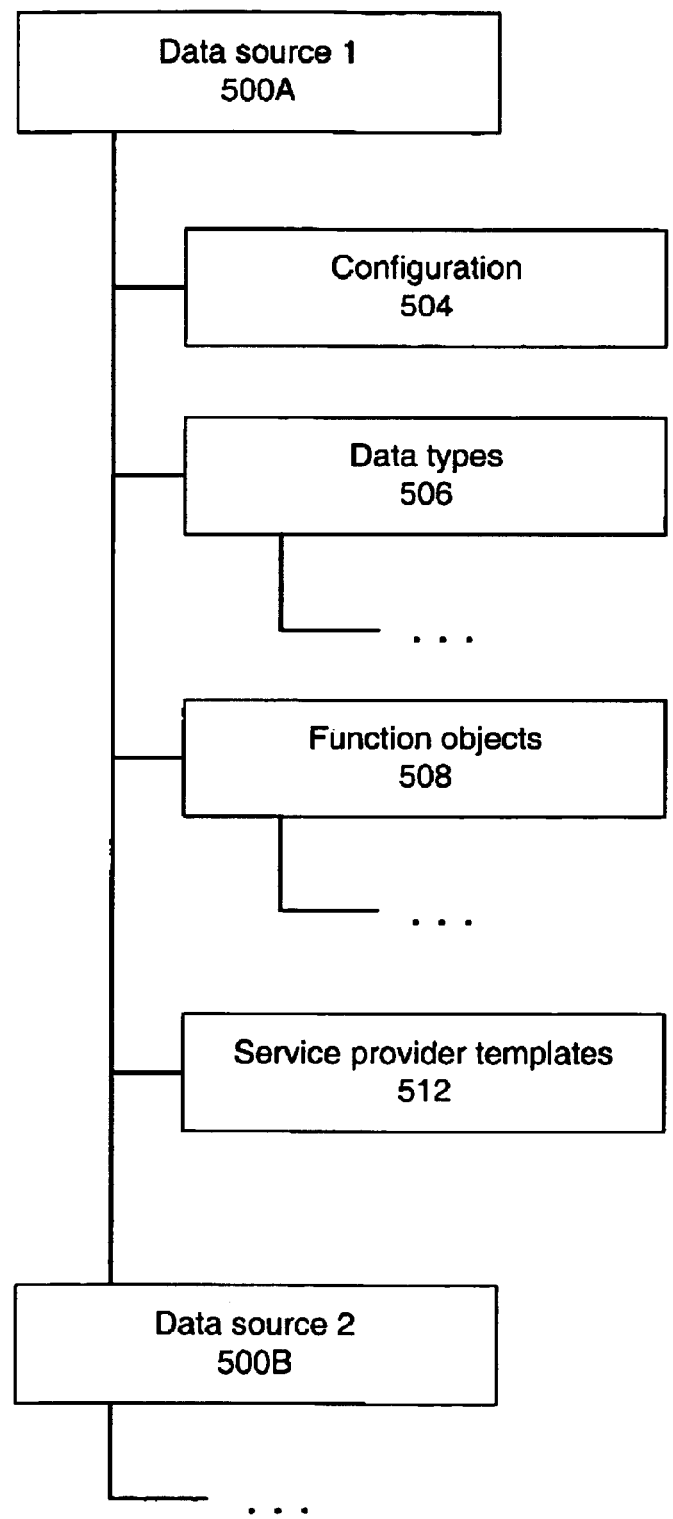
FIG. 11 illustrates an abstract model in which information stored in a repository for accessing backend systems is organized into data sources.

FIG. 11—Data Source Model

As discussed above, information stored in the repository 410 may be formatted in any of various ways. FIG. 11 illustrates one embodiment in which the information is organized into data sources 500. Each data source may correspond to a particular backend system. In one embodiment, the abstract model shown in FIG. 11 may be represented as one or more XML files.

The configuration information 504 may comprise backend-specific configuration settings, to be interpreted and used by the connector 408 to control its interaction with a specific backend system.

The data type information 506 may comprise data type definitions used to instantiate data objects. Information may be passed between an application server component 402 and a connector 408 using these data objects. The data type definitions may represent structured backend system data types and may be mined from data obtained from the backend system. Each specific backend system may have its own set of data types. For example, the data types may represent parameters, messages, events, etc., depending on the specific backend system. The connector 408 is responsible for marshalling and unmarshalling data objects to and from backend system formats.

The service provider information 512 may comprise information regarding a connection to a backend system, e.g., configuration information required to create a connection. For this configuration information may specify a host, port, username, password, etc., or any additional information required to open or manage a connection.

The function object information 508 may comprise information specifying individual units of interaction available on the backend system. For example, in various embodiments a specific function object may correspond to a specific stored procedure, prepared query, BAPI, RFC, psft message, MQseries message, CICS txn etc., depending on the backend system. As described above, these function objects may be automatically created and stored in the repository, e.g., using a data mining tool associated with each connector.

Figure 12:
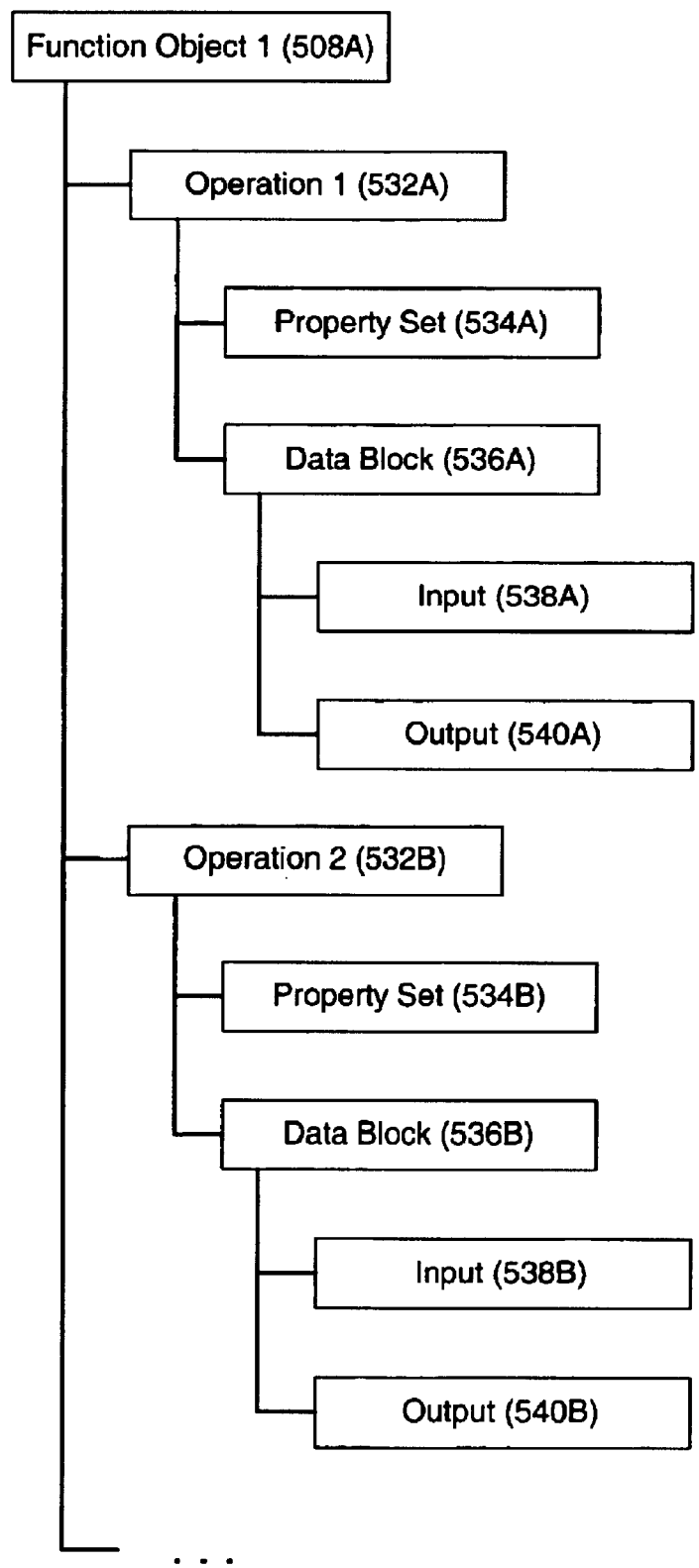
FIG. 12 illustrates an abstract model of a function object, wherein the function object is useable to access specific functionality, e.g., a specific function or stored procedure, of a backend system from an application server.

FIG. 12 illustrates an abstract model of a function object 508, according to one embodiment. This abstract model may be represented as one or more XML files that are stored in the repository.

Each function object may have one or more associated operations. For example, an MQ message function object may have three operations: SEND, POLL, RECEIVE. However, for other types of function objects there may be only one (default) operation. As shown, each operation may have an associated property set 534 and data block 536.

The property set information 534 may comprise information targeting the operation's execution to specific functionality on the backend system. For example, this information may comprise a stored procedure name, a BAPI name, a Peoplesoft message identifier, a program name, a queue name, etc. The property set information 534 may also comprise other information controlling execution of the operation.

The data block 536 may comprise information specifying inputs and outputs of the operation's execution. The data block information may specify default or initial values. The connector 408 may use the data block information in marshalling and unmarshalling data to/and from backend system formats.

The data source and function object information stored in the repository may be used by the application server in various ways. In one embodiment, the application server is operable to retrieve data source and function object information from the repository and use the retrieved information to instantiate an object-oriented style object which can then be used by an application server component in accessing the corresponding backend system.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for accessing functionality of a computer system, the method comprising:
   an application server connecting to the computer system;
   the application server requesting that the computer system provide information that specifies which programmatically callable functions are executable by the computer system;
   the application server programmatically determining the functionality of the computer system based upon the received information that specifies which programmatically callable functions are executable by the computer system;
   the application server programmatically creating information useable for calling the programmatically callable functions to access the functionality of the computer system; and
   the application server storing the programmatically created information in a repository for use by the application server for accessing the functionality of the computer system.

2. The method of claim 1, wherein the received information includes one or more program files for programs that are executable by the computer system, and wherein determining the functionality of the computer system includes programmatically analyzing the one or more program files.

3. The method of claim 1, further comprising using an application programming interface (API) of the computer system to programmatically determine the information that specifies which programmatically callable functions are executable by the computer system.

4. The method of claim 1, further comprising executing a query on the computer system to programmatically determine the information that specifies which programmatically callable functions are executable by the computer system.

5. The method of claim 1, further comprising: using a graphical user interface (GUI) to display the information that specifies which programmatically callable functions are executable by the computer system;
   receiving user input selecting at least a portion of the information that specifies which programmatically callable functions are executable by the computer system; and
   programmatically analyzing the at least a portion of the information that specifies which programmatically callable functions are executable by the computer system.

6. The method of claim 1, further comprising programmatically creating, in a markup language format, the information useable for calling the functions.

7. The method of claim 1, further comprising programmatically creating, in an XML format, the information useable for calling the functions.

8. The method of claim 1, wherein the computer system is a Customer Information Control System (CICS) an R/3 system, or a PeopleSoft system.

9. The method of claim 8, wherein the information that specifies which programmatically callable functions are executable by the computer system includes one or more COBOL files for programs that execute on the CICS system.

10. The method of claim 8 further comprising using an application programming interface (API) of the R/3 system to determine one or more programmatically callable functions implemented on the R/3 system.

11. The method of claim 8 further comprising executing one or more queries on the PeopleSoft system to determine one or more programmatically callable functions implemented on the PeopleSoft system.

12. The method of claim 1, further comprising the application server retrieving the programmatically created information from the repository and accessing the functionality of the computer system.

13. The method of claim 12, wherein accessing the functionality of the computer system includes using programmatically created information to call the one or more functions implemented on the computer system.

14. The method of claim 12, wherein accessing the functionality of the computer system includes instantiating an object, based on the programmatically created information and executing the object to access the functionality of the computer system.

15. The method of claims 12, wherein accessing the functionality of the computer system includes accessing the functionality of the computer system from a Java platform.

16. The method of claim 12, further comprising the application server accessing the functionality of the computer system in response to receiving from a web user, a request for interaction with the computer system.

17. An application server computer system comprising:
   a memory for storing program instructions; and
   a processor coupled to the memory and configured to execute the program instructions to:
   connect to a second computer system;
   request that the second computer system provide information that specifies which programmatically callable functions are executable by the second computer system;
   determine the functionality of the second computer system based upon the received information that specifies which programmatically callable functions are executable by the application server computer system;
   create information useable for calling the programmatically callable functions to access the functionality of the second computer system; and
   store the programmatically created information in a repository for use by the application server computer system for accessing the functionality of the second computer system.

18. The application server computer system of claim 17, wherein the received information includes one or more program files for programs that are executable by the application server computer system, and wherein determining the functionality of the second computer system includes programmatically analyzing the one or more program files.

19. The application server computer system of claim 17, wherein the processor is further configured to execute the program instructions to use an application programming interface (API) of the second computer system to programmatically determine the information that specifies which programmatically callable functions are executable by the second computer system.

20. The application server computer system of claim 17, wherein the processor is further configured to execute the program instructions to execute a query on the second computer system to programmatically determine the information that specifies which programmatically callable functions are executable by the second computer system.

21. The application server computer system of claim 17, wherein the processor is further configured to execute the program instructions to: use a graphical user interface (GUI) to display the information that specifies which programmatically callable functions are executable by the second computer system; receive user input selecting at least a portion of the information that specifies which programmatically callable functions are executable by the second computer system; and analyze the at least a portion of the information that specifies which programmatically callable functions are executable by the second computer system.

22. The application server computer system of claim 17, wherein the processor is further configured to execute the program instructions to programmatically create, in a markup language format, the information useable for calling the functions.

23. The application server computer system of claim 22, wherein the processor is further configured to execute the program instructions to programmatically create, in an XML format, the information useable for calling the functions.

24. The application server computer system of claim 17, wherein the second computer system is a Customer Information Control System (CICS) an R/3 system, or a PeopleSoft system.

25. The application server computer system of claim 24, wherein the information that specifies which programmatically callable functions are executable by the computer system includes one or more COBOL files for programs that execute on the CICS system.

26. The application server computer system of claim 24, wherein the processor is further configured to execute the program instructions to use an application programming interface (API) of the R/3 system to determine one or more programmatically callable functions implemented on the R/3 system.

27. The application server computer system of claim 24, wherein the processor is further configured to execute the program instructions to execute one or more queries on the PeopleSoft system to determine one or more programmatically callable functions implemented on the PeopleSoft system.

28. The application server computer system of claim 17, wherein the processor is further configured to execute the program instructions to retrieve the programmatically created information from the repository and to access the functionality of the second computer system.

29. The application server computer system of claim 28, wherein the processor is further configured to execute the program instructions to use programmatically created information to call the one or more functions implemented on the second computer system.

30. The application server computer system of claim 28, wherein the processor is further configured to execute the program instructions to instantiate an object, based on the programmatically created information and to execute the object to access the functionality of the second computer system.

31. The application server computer system of claim 28, wherein the processor is further configured to execute the program instructions to access the functionality of the second computer system using a Java platform.

32. The application server computer system of claim 28, wherein the processor is further configured to execute the program instructions to access the functionality of the computer system in response to receiving from a web user, a request for interaction with the second computer system.

33. A computer readable medium comprising program instructions, which when executed by a processor of an application server computer, are executable to:
   connect to a second computer system; request that the second computer system provide information that specifies which programmatically callable functions are executable by the second computer system;
   programmatically determine the functionality of the second computer system based upon the received information that specifies which programmatically callable functions are executable by the second computer system;
   programmatically create information useable for calling the programmatically callable functions to access the functionality of the second computer system; and
   storing the programmatically created information in a repository for use by the application server for accessing the functionality of the second computer system.

34. The computer readable medium of claim 33, wherein the received information includes one or more program files for programs that are executable by the second computer system, and wherein the program instructions are further executable to determine the functionality of the second computer system by programmatically analyzing the one or more program files.

35. The computer readable medium of claim 33, wherein the program instructions are further executable to use an application programming interface (API) of the second computer system to programmatically determine the information that specifies which programmatically callable functions are executable by the second computer system.

36. The computer readable medium of claim 33, wherein the program instructions are further executable to execute a query on the second computer system to programmatically determine the information that specifies which programmatically callable functions are executable by the second computer system.

37. The computer readable medium of claim 33, wherein the program instructions are further executable to:
   use a graphical user interface (GUI) to display the information that specifies which programmatically callable functions are executable by the second computer system;
   receive user input selecting at least a portion of the information that specifies which programmatically callable functions are executable by the second computer system; and
   programmatically analyze the at least a portion of the information that specifies which programmatically callable functions are executable by the second computer system.

38. The computer readable medium of claim 33, wherein the program instructions are further executable to programmatically create, in a markup language format, the information useable for calling the functions.

39. The computer readable medium of claim 33, wherein the program instructions are further executable to programmatically create, in an XML format, the information useable for calling the functions.

40. The computer readable medium of claim 33, wherein the second computer system is a Customer Information Control System (CICS), an R/3 system, or a Peoplesoft system.

41. The computer readable medium of claim 40, wherein the information that specifies which programmatically callable functions are executable by the second computer system includes one or more COBOL files for programs that execute on the CICS system.

42. The computer readable medium of claim 40, wherein the program instructions are further executable to use an application programming interface (API) of the R/3 system to determine one or more programmatically callable functions implemented on the R/3 system.

43. The computer readable medium of claim 40, wherein the program instructions are further executable to execute one or more queries on the PeopleSoft system to determine one or more programmatically callable functions implemented on the PeopleSoft system.

44. The computer readable medium of claim 33, wherein the program instructions are further executable to retrieve the programmatically created information from the repository and to access the functionality of the second computer system.

45. The computer readable medium of claim 44, wherein the program instructions are further executable to use the programmatically created information stored within the repository to call the one or more functions implemented on the second computer system.

46. The computer readable medium of claim 44, wherein the program instructions are further executable to instantiate an object, based on the programmatically created information and executing the object to access the functionality of the second computer system.

47. The computer readable medium of claim 44, wherein the program instructions are further executable to access the functionality of the second computer system from a Java platform.

48. The computer readable medium of claim 44, wherein the program instructions are further executable to access the functionality of the second computer system in response to receiving from a web user, a request for interaction with the second computer system.

* * * * *